April 28, 1936. F. MAZZINI 2,039,179
AIR CIRCULATION VALVE IN THE SUPPORTING SURFACES OF AEROPLANES
Filed June 29, 1934 2 Sheets-Sheet 1
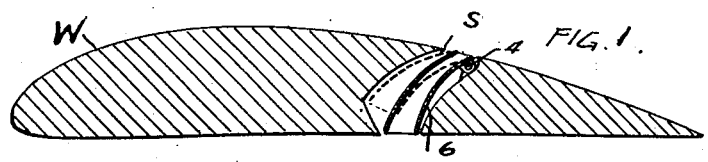
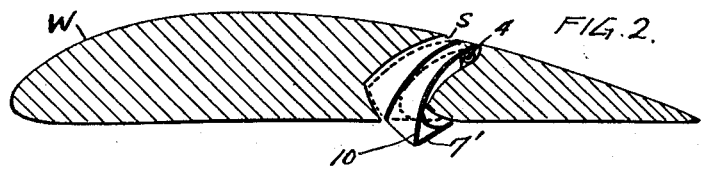
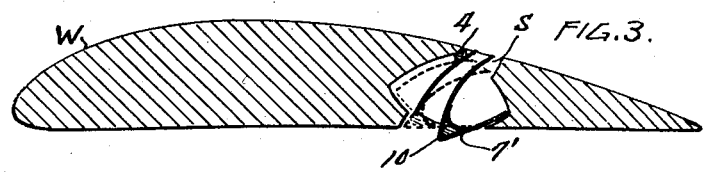
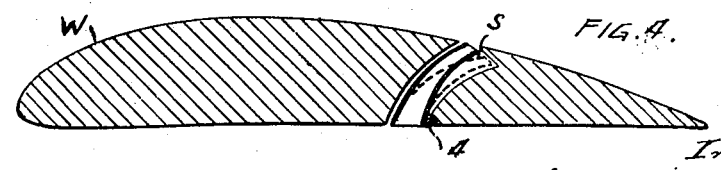

April 28, 1936. F. MAZZINI 2,039,179
AIR CIRCULATION VALVE IN THE SUPPORTING SURFACES OF AEROPLANES
Filed June 29, 1934 2 Sheets-Sheet 2
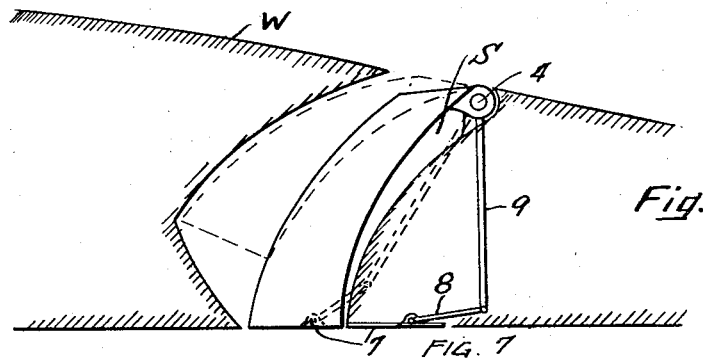
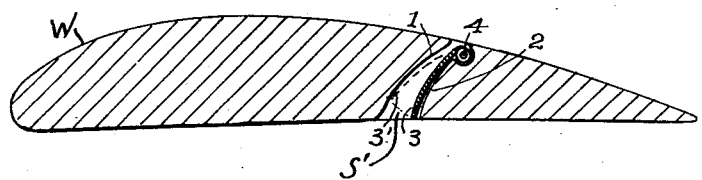
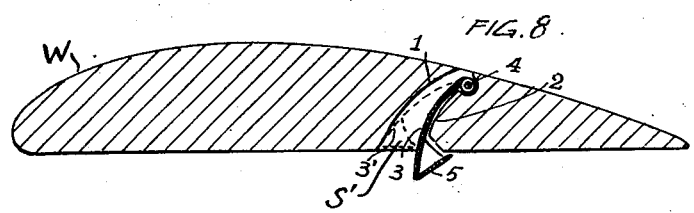
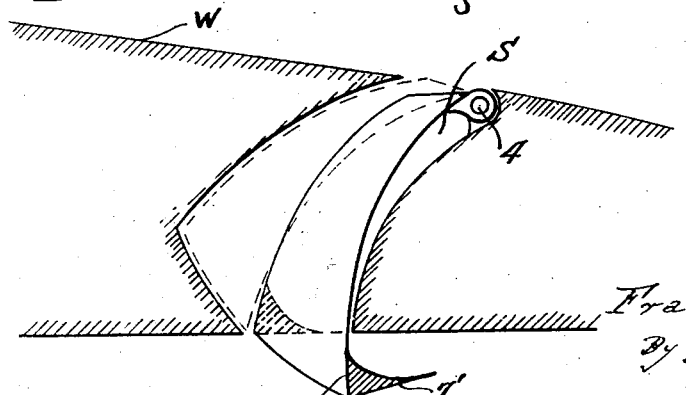
Inventor:
Franco Mazzini
By
Attorney Patented Apr. 28, 1936

2,039,179

UNITED STATES PATENT OFFICE 2,039,179

AIR-CIRCULATION VALVE IN THE SUPPORTING SURFACES OF AEROPLANES

Franco Mazzini, Milan, Italy

Application June 29, 1934, Serial No. 733,133
In Italy July 5, 1933

6 Claims. (Cl. 244—12)

The development of aeronautical construction has led to an improvement in aerodynamic form of aeroplanes and to a considerable increase in the surface loading of their supporting planes. In consequence it is necessary to provide aerodynamic braking arrangements which enable the landing speed to be reduced to within the limits of safety. The object of the present invention is to attain this result by means of the simple rocking of a valve device arranged longitudinally of an opening formed longitudinally of the wing, and enclosed in the interior of the said wing in such a manner as to enable, at any desired instant, a circulation of air to be established between the lower surface and the upper surface, which produces a considerable increase in drag and an appreciable reduction in landing speed, while maintaining, and even increasing, the lift.

To accomplish this object, valves are employed which are adapted to fit in openings leading from the lower surface to the upper surface of the wings of aeroplanes, and which are formed by an element movable under the influence of a suitable control device, the element occupying substantially the full depth of the opening and being so formed that in one extreme position it completely closes the said opening, while in the other extreme position it provides a wholly unobstructed passage through the opening, having smooth and properly formed boundaries, which guides the stream of air without causing sudden changes of section or direction.

The invention depends essentially on the fact that during normal flight the valve device conforms exactly to the outer profile of the wing and does not alter its aerodynamic performance. The valve can be opened at any speed of the machine (that is to say, corresponding to any angle of incidence of the wings) by means of a simple control device, so as to allow of the establishment of an air circulation which has a braking effect. If the operation of the valve is confined to times when the angle of incidence is large, its movement may be effected automatically, the valve being balanced with the aid of a suitable pendulum system.

The valve may be placed at any desired position along the wing section: In the accompanying drawings the position selected is at two-thirds of the chord length, measured from the leading edge, in view of the fact that in the ordinary construction there are no obstructions (principal structural members, controls, and so forth) at this position. The valve device is applicable to wings of various sections, and it can be formed in different ways.

Figure 1 is a more or less diagrammatic sectional view of an airfoil having a valve constructed in accordance with the present invention.

Fig. 2 is a similar view showing a modified form of the invention.

Figs. 3 and 4 are views similar to Fig. 1 showing various modifications.

Fig. 5 is an enlarged detail view in section of the structure shown in Fig. 1.

Fig. 6 is an enlarged detail view in section of the structure shown in Fig. 2.

Figs. 7, 8 and 9 are views similar to Fig. 1 showing further modifications of the invention.

In Fig. 1 there is shown a wing W having a slot S extending longitudinally thereof and providing a passage for the flow of air from the lower surface of the wing to the upper surface. A valve body 6 is positioned within the slot S for rocking movement about the axis of shaft 4 by which the movement is effected. The valve body 6 is of shell construction open at its upper and lower ends. In its open position the upper and lower open ends of the valve body register with the upper and lower ends, respectively, of the slot or passage S. When in its closed position the valve body 6 is rocked to the location indicated by dotted lines in Fig. 1 and as shown in Fig. 5 a cover 7 for the opening in the lower surface of the wing is shifted by linkage 8, 9 to its closing position.

The passage through the valve body 6 is of varying cross-section and is curved at its upper end toward the rear.

In Figs. 2 and 6 a modified form of construction is shown. In this form of invention the closure 7' for the opening in the lower surface of the wing is carried by the valve body and the rear wall of the passage through the valve body is extended to provide a scoop 10 which projects below the lower surface of the wing when the valve body is in open position. When the valve is in open position, the scoop deflects air flowing under the lower surface of the wing into and through the passage provided in the valve body.

A slight modification of the structure of Fig. 2 is shown in Fig. 3. The pivot 4 in the structure of Fig. 3 is located on the forward wall of slot S and the closure 7' is of increased width to properly close the opening in the lower surface of the wing.

A structure somewhat similar to that of Fig. 1 is shown in Fig. 4. In Fig. 4, however, the pivot 4 is positioned on the lower portion of the rear wall of slot S.

The invention may be carried into practice by simpler means, employing a valve element formed by a simple smooth plate, suitably curved, hinged at one of its edges close to the edge of one of the mouths of the through passage or slot in which it is accommodated, and so arranged that in its open position it forms, with the surface of the said passage which is opposite the hinge, a smooth channel, while in its closed position it bears against a part of this surface, closing the passage.

The plate forming the valve may be provided with a projection arranged to correspond with the lower mouth of the passage in the wing and adapted to project outwards when the valve is open, so as to form a scoop for the air.

Figs. 7, 8 and 9 of the drawings show three constructional forms in which the hinge is disposed at the top (Figs. 7 and 8), or at the bottom (Fig. 9), and which in the case of Fig. 8 is also provided with the scoop projection. In these three constructional forms, which may be considered the most interesting in view of their simplicity, the valve is accommodated in a through passage S' bounded by smooth walls 1 and 2, forming a duct, narrowing upwards and curved rearwards. The plate forming the valve has a profile the same as that of the wall to which it is hinged, so that in its closed position this plate 3 occupies the position 3', against the opposite wall 1, so as to obstruct the passage. In the example shown in Fig. 8, the projection 5 assumes the position 5' when it is concealed in the body of the wing.

Other analogous arrangements may be adopted without departing from the scope of the invention.

I claim:

1. An aeroplane wing having a laterally elongated opening leading from the lower to the upper surface thereof, a tube with its inner walls smooth and free from abrupt changes in direction, said tube being pivotally mounted about a laterally extending axis adjacent to one of said surfaces, disposed in said opening, and occupying substantially the full depth thereof, said opening having a lateral recess adapted to accommodate the end of said tube remote from said axis, and control means operable for rocking said tube so as to bring said last-mentioned end alternatively into said recess and into register with the end of said opening in the adjacent wing surface.

2. An aeroplane wing according to claim 10, in which the rear wall of the tube is extended to form an air scoop capable of engaging air flowing over said lower surface and directing it into said passage when the tube registers with the opening.

3. An aeroplane wing having a laterally elongated opening leading from the lower to the upper surface thereof, a tube with its inner walls smooth and free from abrupt changes in direction, said tube being pivotally mounted about a laterally extending axis adjacent the upper surface, disposed in said opening and occupying substantially the full depth thereof, said opening having a lateral recess formed in the front wall thereof adapted to accommodate the lower end of said tube, and control means operable for rocking said tube so as to bring said lower end of the tube alternately into said recess and into register with the end of the opening in the lower surface of the wing.

4. An aeroplane wing having a laterally elongated opening leading from the lower to the upper surface thereof, a tube with its inner walls smooth and free from abrupt changes in direction, said tube being pivotally mounted about a laterally extending axis adjacent the upper surface, disposed in said opening and occupying substantially the full depth thereof, said opening having a lateral recess formed in the front wall thereof adapted to accommodate the lower end of said tube, control means operable for rocking said tube so as to bring said lower end of the tube alternately into said recess and into register with the end of the opening in the lower surface of the wing, the lower portion of the rear wall of the tube being extended to form an air scoop for deflecting air flowing over the lower surface of the wing into said tube when in register with said lower wing surface opening, and means carried by said lower extended portion of the rear wall for closing the opening in the lower wing surface when the lower end of said tube is in said recess.

5. An aeroplane wing having a laterally elongated opening leading from the lower to the upper surface thereof, a tube with its inner walls smooth and free from abrupt changes in direction, said tube being pivotally mounted about a laterally extending axis adjacent the upper surface, disposed in said opening and occupying substantially the full depth thereof, said opening having a lateral recess formed in the front wall thereof adapted to accommodate the lower end of said tube, control means operable for rocking said tube so as to bring said lower end of the tube alternately into said recess and into register with the end of the opening in the lower surface of the wing, the lower portion of the rear wall of the tube being extended to form an air scoop for deflecting air flowing over the lower surface of the wing into said tube when in register with said lower wing surface opening, means carried by said lower extended portion of the rear wall for closing the opening in the lower wing surface when the lower end of said tube is in said recess, and the rear wall of said laterally elongated opening having a recess formed therein to accommodate the closing means when the lower end of the tube is in register with the opening in the lower surface of the wing.

6. An aeroplane wing having a laterally elongated opening leading from the lower to the upper surface thereof, a tube with its inner walls smooth and free from abrupt changes in direction, said tube being pivotally mounted about a laterally extending axis adjacent the lower surface, disposed in said opening and occupying substantially the full depth thereof, said opening having a lateral recess formed in the rear wall thereof adapted to accommodate the upper end of said tube, and control means for rocking said tube so as to bring the upper end thereof alternately into said recess and into register with the end of the opening in the upper surface of the wing.

FRANCO MAZZINI.